Patented Oct. 27, 1936

2,059,104

UNITED STATES PATENT OFFICE 2,059,104

AUTOMATIC CONTROL VALVE

Herschel Harrah, Indianapolis, Ind., assignor, by mesne assignments, to Union Carbide and Carbon Corporation, a corporation of New York Application April 16, 1931, Serial No. 530,630

22 Claims. (Cl. 137—153)

The invention is an automatic control valve to be used at the junction of a plurality of supply lines and a delivery line, and its purpose is to connect the delivery line to only one supply line at a time; to show the pressure in each supply line; to automatically shift from one supply line to another when the one in use becomes exhausted; and to maintain a substantially uniform pressure in the delivery line. The valve is especially adapted for such use when the supply is subject to variations in pressure and exhaustion, such as tanks or cylinders of liquified hydrocarbon gas. The delivery line may be connected to any gas consuming apparatus or appliances such as a gas stove or a gas light.

The valve is entirely automatic in action so that the only manual attention required is that of replacing the exhausted cylinders with full ones, and it is also provided with means for preventing leakage from a reserve cylinder into the valve from causing it to open a new source of supply before the one in use has become exhausted. Other new and useful features will be apparent from the following specification and the accompanying drawings in which.

Figure 1:
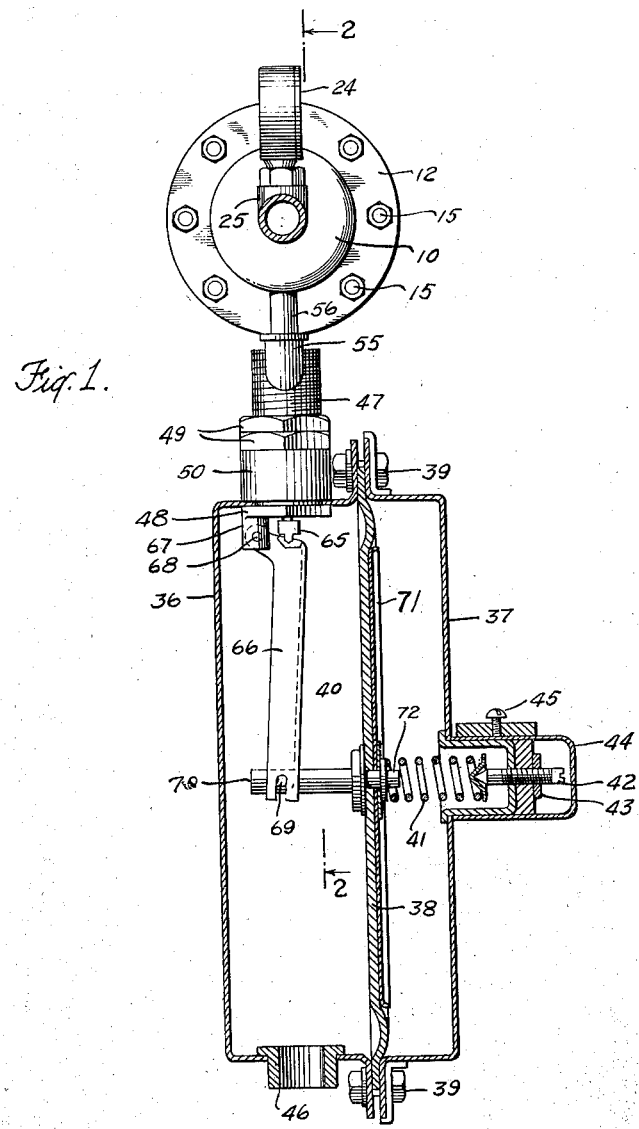
Fig. 1 is a side view of my control valve with the lower portion thereof in section.
Figure 2:
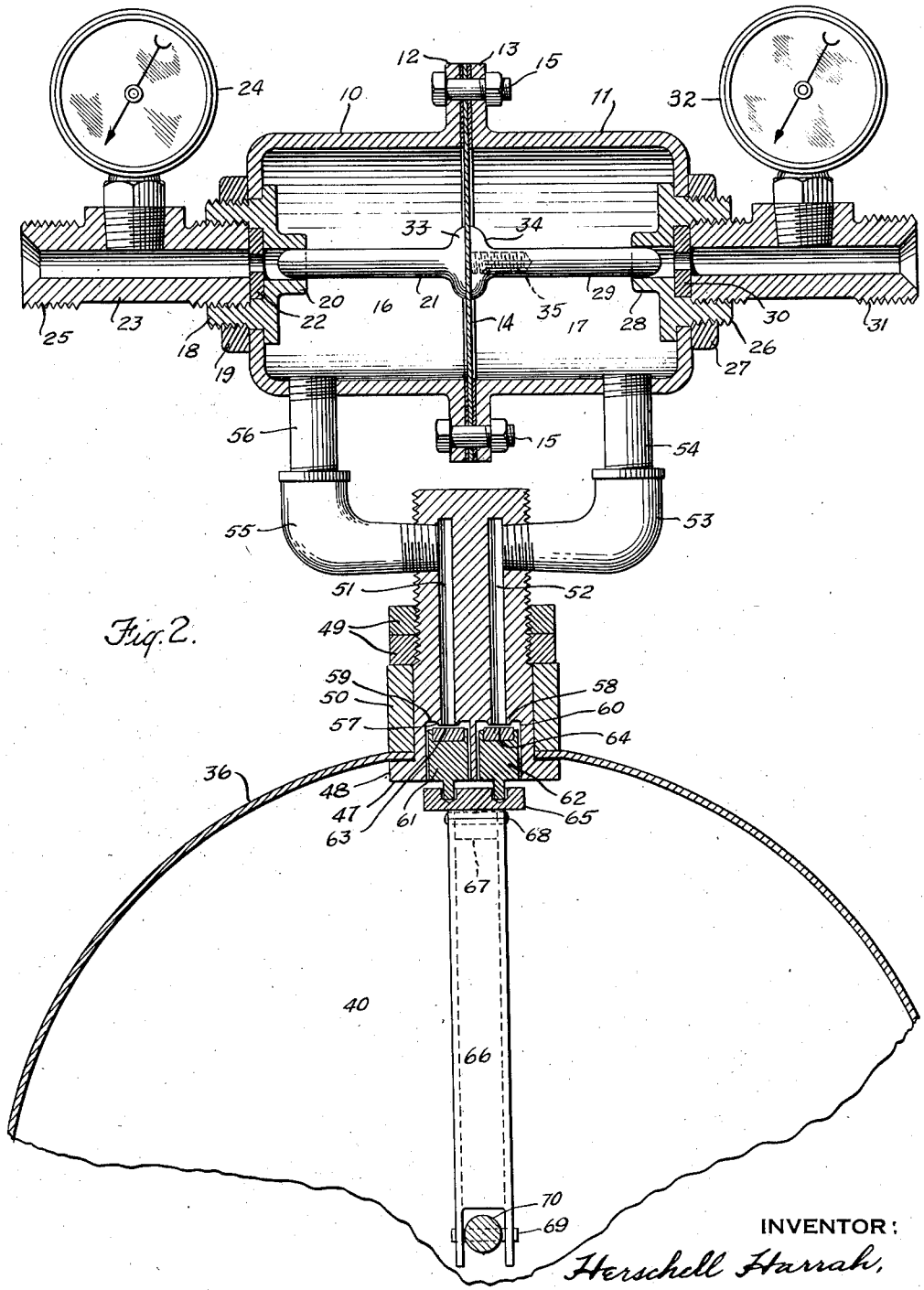
Fig. 2 is a sectional view of the upper portion of my valve taken along line 2—2 of Fig. 1.

The control valve may, for purpose of explanation, be considered in two parts: the upper, comprising an automatic supply selecting mechanism; and the lower, comprising a pressure regulating mechanism. Under some conditions of service either of these sections, especially the upper, may be used separately, but on account of their interaction better results will be attained when they are used together as shown.

The complete valve has two inlet chambers each in communication with an outlet chamber by a connecting passage that may be opened and closed by a valve operated by pressure responsive means, such as a diaphragm, forming one wall of, or responsive to the pressure in, the outlet chamber. This outlet chamber together with its valves and valve operating mechanism forms the lower part of the control valve. The upper part of the control valve comprises the aforementioned inlet chambers each having one wall formed by a pressure responsive member such as a diaphragm which may separate the chambers and be common to both. Each inlet chamber has an inlet passage leading to one of the supply lines which, in turn, is connected with one of the sources of supply. Associated with each inlet chamber is a valve that is operated by a movement of the diaphragm to open and close the inlet thereto. These inlet valves are arranged so that when one is closed the other is open thereby admitting gas from only one supply at a time. For convenience, the valve operating stems may be attached together and to the diaphragm, either directly or indirectly, so that they move in unison, and preferably they are attached to opposite sides of the diaphragm so that one stem is in each inlet chamber. A pressure indicator or gauge is connected to each supply line near the control valve for the purpose of showing when a source of supply such as one of the cylinders hase become exhausted and should be replaced by a full one.

The upper portion of the valve comprises two identical or complementary metal casing portions 10 and 11 having respective flanges 12 and 13 by which the casing portions are held together, and to an interposed diaphragm 14, of suitable material such as rubber, by a plurality of bolts 15 thereby forming two inlet chambers 16 and 17. In one wall of the casing portion 10, preferably that opposite the diaphragm, there is an opening in which a valve case 18 is secured by a nut 19. An inlet passage extends through this valve case, and around the inner end of this passage a projection 20, or a portion of the case 18, extends into the inlet chamber 16 and forms a guide for its associated valve stem 21. The outer end of this inlet passage is enlarged and its surrounding wall is threaded. In the bottom of this enlarged portion an annular valve seat 22 of suitable material is held by the threaded inner end of a connection 23 that extends outward beyond the case 18 and carries a pressure gage 24 and an outer end 25 to which an inlet pipe, not shown, is attached when the valve is in use. The valve seat 22 has the additional function of a gasket that seals the opening between the inner end of the connection 23 and the bottom of the enlarged opening in the valve case 18. While the openings through the connection 23, valve seat 22, and valve case 18, are in alignment, with a side passage leading to the pressure gage 24, this arrangement is not imperative, as the valve will operate satisfactorily when the passage is of other shape.

Inlet chamber 17, like its companion chamber 16, has a valve case 26, nut 27, projection 28, forming a guide for valve stem 29, valve seat 30, connection 31, and pressure gage 32.

For convenience in mounting, the valve stems 21 and 29 have enlarged inner ends 33 and 34 in contact with the diaphragm 14, and stem 21 has a threaded projection 35 that extends through an opening at the center of the diaphragm into a threaded cavity in the enlarged end of stem 29. By means of this threaded connection between the stems they are held together and clamped to the diaphragm which serves as a packing or gasket between them so that leakage between the inlet chambers is prevented. The diaphragm 14 also serves as a gasket by which the joint between the casing sections 10 and 11 is rendered gas tight. The outer ends of the valve stems 21 and 29 rest in their respective valve guides 20 and 28 with a loose or sliding fit so that they are free to move into contact with their respective valve seats 22 and 30 when moved by the diaphragm 14, and so that incoming gas can pass between the stems and their guides.

The lower part of the control valve comprises a pressure regulator having two inlets to the pressure chamber. Each inlet leads to one of the inlet chambers 16 and 17, and it is opened and closed by a valve that is operated by a diaphragm responsive to the pressure in the control or outlet chamber.

This pressure regulator comprises two casing parts 36 and 37 that are clamped together and to an interposed diaphragm 38 by a plurality of bolts 39. The space between the casing part 36 and the diaphragm 38 forms an outlet or control chamber 40 in which there is a pressure to which the diaphragm is responsive when the valve is in operation.

The diaphragm 38 is resiliently pressed into or toward the chamber 40 by a spring 41 that rests against an adjusting screw 42 extending outward through the casing part 37 and secured in adjusted position by a jam nut 43. By loosening this nut 43, the adjusting screw 42 may then be turned to place the required tension on the diaphragm 38 to secure the desired pressure in chamber 40. A cap 44 secured to casing 37 by a set screw 45 covers jam nut 43 and the exposed end of screw 42 and protects them from accidental movement.

Attached to one side of casing 36, such as the lower, is a nipple or collar 46 having an opening therethrough that serves as an outlet for chamber 40. This nipple may be threaded to fit a suitable outlet pipe, not shown, or it may be provided with other means to which an outlet pipe or conduit may be coupled.

Attached to another side of casing 36, such as the upper, is a valve body 47. The nipple 46 and the valve body 47 may be attached to the casing 36 by solder or other suitable means, although, for the purpose of removal, the valve body 47 is provided with an enlargement or head 48 that is held against the inner surface of casing 36 by one or more jam nuts 49 threaded to the portion of the valve body that extends upward outside of the casing. One or more washers 50 may be interposed between the nuts 49 and the outer surface of casing 36 when desirable.

The valve casing 47 has two passages 51 and 52 formed therein that lead upward from chamber 40. Threaded into one side of valve body 47 is an elbow 53 that is connected to casing portion 11 by nipple 54, thereby connecting passage 52 with chamber 17. A similar elbow 55 and nipple 56 connect passage 51 with chamber 16. It is understood, however, that other means may be employed to connect chamber 40 with chambers 16 and 17 as the means by which they are connected is not vital so long as they are separate.

The lower end of passages 51 and 52 are enlarged or recessed where they enter chamber 40 so that valve seats 57 and 58 are formed at the bottom of recesses 59 and 60, and valves 61 and 62 are respectively located in the recesses so that their faces 63 and 64 of suitable material may be respectively seated on the seats 57 and 58 to close passages 51 and 52.

The valves 61 and 62 are operated by a rocker arm 65 that is interposed between the valves and an actuating arm 66 that is pivoted on a bearing pin 68 carried by a projection 67 depending from valve body 47. The lower end of actuating arm 66 is forked to receive pin 69 carried by actuating rod 70 that is secured to diaphragm 38 in a well known manner. The rod 70 may, however, extend through diaphragm 38 and be joined to a diaphragm supporting disk 71 and a seat 72 for spring 41.

When the control valve is in operation a source of supply such as a tank or cylinder of liquefied hydrocarbon gas is connected with each of the inlet connections 23 and 31, and suitable gas consuming devices or appliances are connected with nipple 46.

When gas from one of the cylinders is turned into the valve, say through connection 31, it flows through valve 30 which is open, into inlet chamber 17, out through nipple 54 and elbow 53 into passage 52, and then through valve 58 which is open into chamber 40. When sufficient pressure has been built up in chamber 40 to move diaphragm 38 to the right against the pressure of spring 41, valves 61 and 62 will be moved to closed position by actuating arm 66, and the parts associated therewith, thereby closing both of the passages 51 and 52 so that the flow of gas into chamber 40 is stopped. Pressure will then be built up in inlet chamber 17 sufficient to move diaphragm 14 to the left until the end of valve stem 21 seats on valve seat 22 thereby closing the inlet to chamber 16. This series of movements takes place quickly so that when a second cylinder is coupled to connection 23 and the gas is turned on the inlet to chamber 16 is found to be closed.

The valve is now in condition for operation. As gas is used the pressure in chamber 40 is lowered and spring 41 forces the diaphragm 38 to the left and opens valves 61 and 62 by means of the interconnecting mechanism so that more gas is admitted from chamber 17 to maintain the pressure. As the operation of pressure regulators is well known further description of the operation of this portion of the control valve is deemed unnecessary.

One important improvement, however, in the pressure regulating portion of this valve is the use of two inlets and inlet valves instead of one. By placing valves 61 and 62 in separate inlets from the chambers 16 and 17 any rise in pressure in chamber 16 above that in chamber 40, due to leakage past its closed inlet valve, is lowered to that in chamber 40 each time valves 61 and 62 are opened. This structure prevents leakage past a closed inlet valve from raising the pressure in the closed inlet chamber to that of the open one. Such leakage would cause the diaphragm 14 to move to its central position, in which the inlet valves to both inlet chambers would be open so that gas would be used from both sources of supply, thereby exhausting them simultaneously.

This would be an undesirable condition as the delivery line would then be without gas until another cylinder had been secured and connected.

With the valve in the condition described gas will be used from chamber 17 until the source of supply connected thereto is exhausted and the pressure in this chamber is reduced to substantially that of chambers 40 and 16. When this condition is reached diaphragm 14 will no longer hold valve stem 21 against its seat 22 and consequently gas will be admitted into chamber 16 thereby raising the pressure therein sufficient to move the diaphragm to the right until valve stem 29 is firmly seated on valve seat 30 and the inlet to chamber 17 is closed. The valve will then continue to operate by drawing gas from chamber 16 and its associated source of supply.

A visual inspection of the control valve when in this condition will show a high pressure on gage 24 and a low pressure on gage 32. This condition indicates to the user that the gas in the cylinder connected to chamber 17 has been exhausted and that it should be replaced by a full one. The full cylinder may be connected when convenient and no gas will escape from the control valve during the operation as the inlet to chamber 17 is closed. For the same reason, no gas will be used from this new cylinder until that connected to chamber 16 has been exhausted and diaphragm 14, and its associated valve stems, have reversed their position. As shown by the foregoing description, the only attention required by this control valve is that of replacing the empty gas cylinders with full ones.

This valve is not limited to any particular source of supply or supply pressure, or to any particular delivery pressure or gas consuming appliances, as it may be used wherever a valve having its characteristics is desirable. Furthermore, its component parts may be altered in appearance and arrangement to meet specific conditions, and other or equivalent materials may be employed instead of those specified.

I claim:

1. A control valve comprising the combination of two inlets and an outlet; means responsive to the pressure differential between said inlets for closing either one or the other of the inlets; and means responsive to the pressure at said outlet for controlling the pressure at said outlet.

2. A control valve comprising two inlets and an outlet; means responsive to the pressure within said valve for controlling the pressure at said outlet; and means responsive to the difference in pressure at said inlets for closing the inlet at which the pressure is low and opening the inlet at which the pressure is high.

3. A control valve comprising the combination of two inlets and an outlet; means responsive to the pressure at said outlet for controlling the same; and means responsive to the pressure at both of said inlets for closing one when the pressure thereat drops to substantially that of said outlet and the pressure at the other is higher than that of said outlet.

4. A fluid control valve comprising a casing having an outlet and two inlets at which the fluid pressure at either inlet may vary independently of that at the other inlet; means responsive to the pressure at said outlet for controlling the flow of said fluid between both of said inlets and said outlet; and means within said valve responsive to the fluid pressure at both of said inlets for maintaining either of said inlets closed while the pressure at the other inlet is above that at said outlet.

5. A control valve comprising the combination of two inlet chambers and an outlet chamber; a passage between each of said inlet chambers and said outlet chamber; inlets for the inlet chambers and pressure responsive means in control thereof; and pressure responsive means in control of the passage of fluid between both of the inlet chambers and the outlet chamber.

6. A control valve comprising two inlet chambers; an inlet for each of said chambers; means responsive to the pressure in both of said inlet chambers for closing either of said inlets; an outlet chamber; a passage connecting each of said inlet chambers with said outlet chamber; and means responsive to the pressure in said outlet chamber for opening and closing said passages.

7. A control valve comprising two inlet chambers; a pressure responsive diaphragm separating said chambers; an inlet for each of said chambers; an outlet for each of said chambers; valve means operable by said diaphragm for closing either of said inlets; an outlet chamber; and pressure responsive means controlling the flow of fluid between the inlet and outlet chambers.

8. A control valve comprising means for coupling said valve to two exhaustible sources of gas supply; means for automatically closing said valve to one of said sources of supply when it becomes exhausted, and for opening said valve to the other of said sources of supply; means for coupling said valve to a gas using appliance; and means for maintaining the gas delivered to said appliance at a uniform pressure.

9. A control valve comprising the combination of an outlet chamber; two inlet chambers; a passage between said outlet chamber and each of said inlet chambers; an inlet for each of said inlet chambers; an outlet for said outlet chamber; means responsive to a difference in pressure between said inlet chambers for closing the inlet to that having the lower pressure; and means responsive to the pressure in said outlet chamber for opening and closing said passages.

10. A control valve comprising the combination of two inlet chambers and an outlet chamber; a gas inlet for each of said inlet chambers; a connecting passage between each of said inlet chambers and said outlet chamber; selective means responsive to the pressure in both of said inlet chambers for closing the inlet to either; an outlet for said outlet chamber; and means for controlling the flow of gas from said open inlet chamber to said outlet chamber, and for preventing a leakage of gas into said closed inlet chamber from reversing the position of said selective means.

11. A control valve comprising an outlet chamber and two inlet chambers connected therewith by separate passages; a diaphragm responsive to the pressure in both of said inlet chambers; an inlet for each of said inlet chambers; a valve in each of said inlets having valve stems attached together and to said diaphragm; and a valve in each of said passages.

12. A control valve comprising two inlet chambers; a diaphragm forming one wall of each of said chambers; a gas inlet for each of said chambers; an inlet valve in each of said inlets operable by said diaphragm; an outlet chamber; a passage from each of said inlet chambers to said outlet chamber; and means responsive to the pressure in said outlet chamber for opening and closing said passages.

13. A control valve comprising two inlet chambers; an outlet chamber; a communicating passage from each of said inlet chambers to said outlet chamber; an inlet for each of said inlet chambers; an outlet for said outlet chamber; a diaphragm forming one wall of each of said inlet chambers; valve means operable by said diaphragm for closing either of said inlets; means for indicating the pressure at each of said inlets; and means for opening and closing both of said passages simultaneously.

14. A control valve comprising two inlet chambers; a pressure responsive diaphragm forming one wall of each of said chambers; an inlet for each of said chambers; a valve seat in each of said inlets; a projection surrounding each of said inlets forming a valve guide; an outlet for each of said chambers leading to a common outlet chamber; and a valve resting in each of said guides and movable by said diaphragm into contact with one of said valve seats.

15. In apparatus of the character described, means for delivering fluid at a constant pressure to apparatus adapted for employing the same and from a plurality of sources; means forming a communication between the delivery means and the several sources; means operable automatically and responsively to a differential in pressure between the various sources for shifting connection of the delivery means from a source of lower to a source of higher pressure; and means operable automatically to maintain the delivered fluid at constant pressure and uninterrupted in flow, said means including pressure responsive mechanism under influence of said fluid.

16. A control valve comprising the combination of two inlet chambers and an outlet chamber; a gas inlet for each of said inlet chambers; an outlet for said outlet chamber; selective means responsive to the pressure in both of said inlet chambers for closing the inlet to one; and means for relieving the gas pressure in said closed inlet chamber caused by leakage so it will not reverse the position of said selective means.

17. A control valve including two inlet chambers; pressure responsive means separating the chambers; an inlet and an outlet for each chamber; means operable by the pressure responsive means for selectively closing the inlets; and means restraining the movement of said pressure responsive means so as to prevent it from closing the outlets for said inlet chambers.

18. A control valve including two inlet chambers; a diaphragm separating the chambers; an inlet and an outlet for each chamber; and valves for controlling the flow of a fluid through each of said inlets; said diaphragm being adapted to close one of said valves and simultaneously open the other of said valves, and said diaphragm and valves being adapted to operate so as to permit the flow of fluid through the outlet of the chamber whose inlet valve is closed.

19. A control valve comprising the combination of a casing having an inlet chamber and an outlet chamber; pressure-responsive means separating said inlet chamber into two portions; an inlet for each of said portions; an outlet for each of said portions communicating with said outlet chamber; and means operable by the pressure-responsive means for selectively closing the inlet under influence of a drop in pressure at one or the other of said inlets, said last-mentioned means and said pressure-responsive means being adapted at all times to permit flow between each of said portions and its respective outlet.

20. In a control valve, the combination of a casing having a pair of chambers therein and an inlet and an outlet to each chamber; pressure responsive means responsive to pressure changes in both chambers; valve means operable by the pressure responsive means and capable of being initially positioned for maintaining one of the inlets open and the other closed after being set in such position and to automatically reverse the open and closed relation of the valve means to the inlets when the pressure on the pressure responsive means in the chamber with which the initially open inlet communicates falls below the pressure exerted on the pressure responsive means in the other chamber from the outlet thereof.

21. A control valve comprising the combination of a chambered member having two inlets and an outlet; means responsive to changes in pressure at the outlet for controlling the pressure thereat; and means acting automatically to selectively close the inlets upon development of a pressure differential between the inlets such that the pressure at one of the inlets is substantially the same as that at the outlet and lower than that at the other inlet.

22. A control valve comprising the combination of a casing having a passage therethrough provided with two inlets and an outlet; and means for selectively closing one of the inlets, said means comprising a member operable in response to a drop in pressure at the inlet being closed, such drop being to a pressure not greater than the pressure at said outlet when the pressure at the other inlet is higher than that at said outlet, and closing means for the inlets connected with such pressure responsive member.

HERSCHEL HARRAH.